Aug. 9, 1938.   J. M. HALBING   2,125,916
HEAT APPLYING APPARATUS
Original Filed June 9, 1934
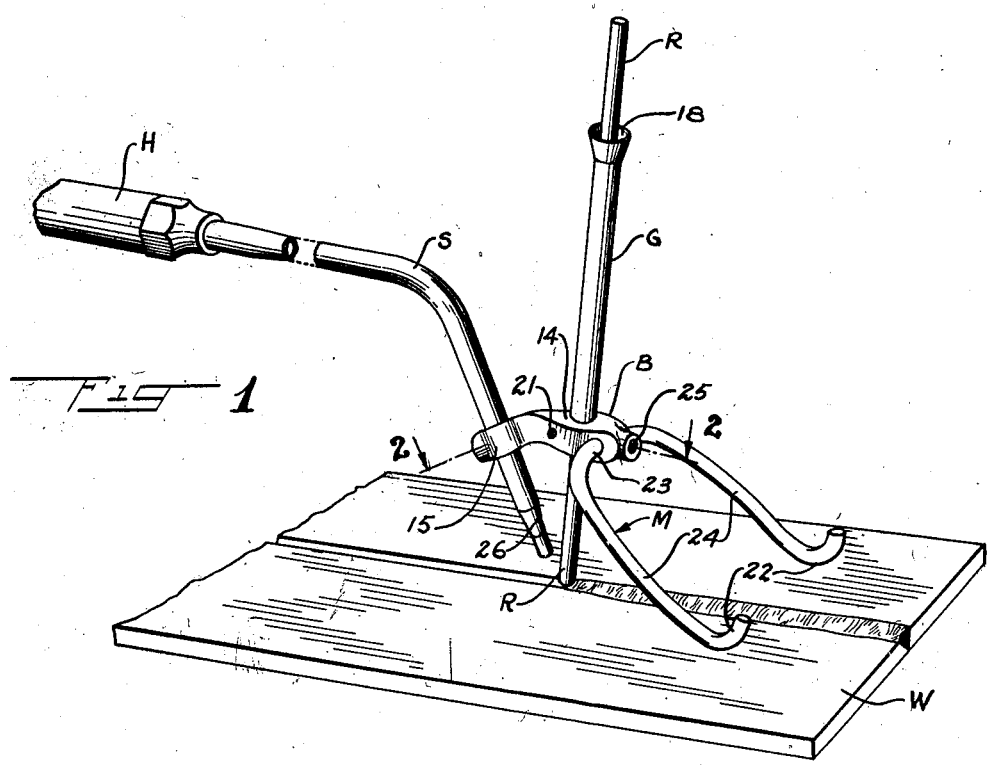
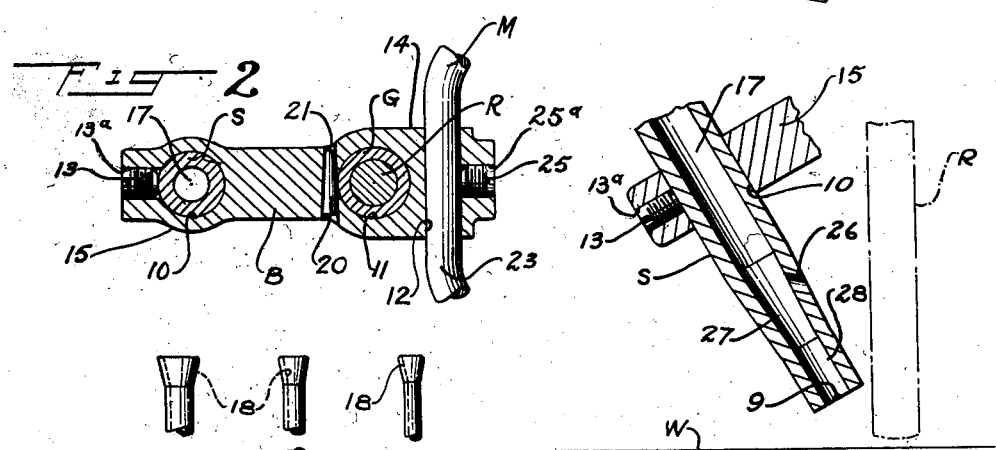
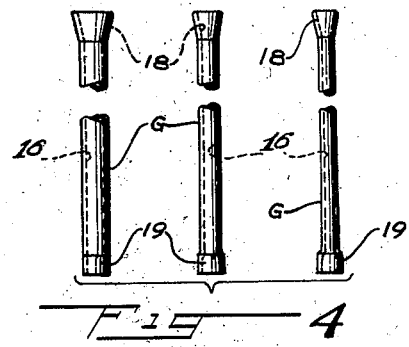
INVENTOR
J. M. HALBING
BY
ATTORNEY Patented Aug. 9, 1938

2,125,916

UNITED STATES PATENT OFFICE 2,125,916

HEAT APPLYING APPARATUS

John M. Halbing, Bloomfield, N. J., assignor, by mesne assignments, to Union Carbide and Carbon Corporation, a corporation of New York Application June 9, 1934, Serial No. 729,821
Renewed December 7, 1937

16 Claims. (Cl. 113—59)

This invention relates to apparatus for applying high-temperature heat to metallic objects as in welding, cutting, deseaming, surfacing and other processes requiring the application of heat. More specifically, the invention relates to hand operated apparatus for use in fusion welding.

An object of the invention is to improve apparatus of this character by simplification of the construction thereof and by reducing the number of parts required for accomplishing the various functions for which the apparatus is designed, and to provide a construction which may be simply and inexpensively manufactured.

A further object of the invention is to provide improved apparatus of the above character adaptable, by simple adjustment and/or simple substitutions, to a variety of work conditions.

A further objection of the invention is to provide an improved blowpipe stem or tip having a main orifice and a preheat orifice in communication with a bore through the stem or tip; the construction of the bore and the relation of the orifices thereto being such as to maintain a proper balance between the quantity of gas discharged through the two orifices.

Other objects and novel features of the invention will become apparent from the following specifications taken with the accompanying drawing, in which, Fig. 1 is a perspective view of welding apparatus embodying the principles of my invention;

Fig. 2 is a sectional view on line 2—2, and on an enlarged scale compared with Fig. 1, showing the manner of separably connecting the various parts of the apparatus together;

Fig. 3 is a fragmentary sectional view showing in detail the tip end of the blowpipe stem and also the relation of the rod preheating jet orifice to the main jet discharging orifice in the tip; and Fig. 4 is a view showing several rod guides with bores of various diameters and the external construction thereof adapting them to be held interchangeably in the same orifice of the blowpipe body with a snug fit.

The apparatus disclosed in the drawing is particularly designed for welding and comprises a body in the nature of a carrying and connecting member B having bores 10, 11 and 12 therethrough respectively for receiving a stem or nozzle S of a blowpipe or other suitable heat applying means which is provided with a handle H at the end of the stem for manipulating the blowpipe flame and for drawing the apparatus along the work surface, a rod guide G for feeding a rod R of welding material to the welding point, and a supporting member M adapted to support a portion of the weight of the apparatus on work W.

The blowpipe stem S has a discharge orifice 9 at its end and is mounted for axial adjustment in the bore or aperture 10 and a suitable device, as a set screw 13, is provided adjustably connected in an aperture 13a intersecting aperture 10 for holding the stem in various positions of adjustment. The stem S may be adjusted axially of aperture 10 in the manner stated above, and may be replaced by stems or nozzles of larger or smaller fuel capacity according as a larger or smaller quantity of heat is desired.

The body B comprises a portion 14 and a portion 15 extending downward therefrom at a slight angle thereto. Aperture 10 extends through this latter portion preferably at substantially right angles thereto and the aperture 11 extends preferably at substantially right angles through the portion 14. However, the arrangement of these two portions may be varied but should be such that the blowpipe will be positioned for projecting its flame onto the lower end of a rod R within the rod guide G and onto the sides of the seam adjacent the point of contact of the rod therewith.

The rod guide G consists of a tubular member having a bore 16 through which a rod R is fed by gravity to the welding point; the upper end of the bore of the guide being flared to funnel shape, as shown at 18, in order to facilitate insertion of a rod therein. The rod guide is preferably replaceably mounted in aperture 11 and a plurality of guides such as shown in Fig. 4, may be provided, differing in bore to correspond with different diameter rods to be used with the apparatus. Each of the interchangeable rod guides may be provided with a portion 19 having an external diameter adapted to substantially fit aperture 11. The lower ends of the guides which rest in aperture 11 are therefore all made of the same diameter as the bore 11 so as to form a snug fit therein. Suitable means, as a tapered pin 20 fitting in a similarly tapered bore 21, is provided for holding the guides in aperture 11; the bore 21 extending transversely through body B and communicating with aperture or bore 11 at one side thereof so that the pin may have binding contact with the rod guide.

The supporting member M is preferably formed from a single metal rod circular in cross-section and bent to a U shape to provide a pair of legs 24 which are rigidly and integrally connected by an element, as yoke 23, which latter extends through the circular aperture 12. The ends of the parallel legs 24 are bent upward to form curved runners 22 adapted to slidably engage a work surface at spaced points on opposite sides of a seam being welded and to rockably support much of the weight of the entire apparatus upon the work. In assembling the same with the body B, one end of the rod from which the supporting member M is formed may be conveniently passed through aperture 12 before the legs and runners are bent to their final form. The supporting member is thus mounted for angular adjustment in the aperture 12 and a suitable device, as a set screw 25, which fits in an aperture 25a that intersects aperture 12, firmly holds the member M in various positions of angular adjustment. By this arrangement the body B and the elements carried thereby may be adjusted to various elevations above the work surface upon which the runners 22 rest, the runners being adjustable as a unit relative to the body B. The rounded and curved form of the runners 22 is advantageous because it affords tangential contact with the work in every direction that the appliance is moved and thus reduces the effort needed to manipulate the latter.

In addition to the main jet-discharging orifice 9 at the tip end of the stem or nozzles S, a second orifice may be provided in the stem for discharging a preheating jet upon the rod R. Such an orifice, which is shown at 26, spaced from the discharge orifice 9 and at an acute angle to the main gas passage for effectively heating the welding rod as it feeds toward the work.

In order to provide sufficient pressure to force enough gas through the orifice 26 to sustain an adequate preheating flame, the bore 17 of the stem S is decreased in diameter toward its lower or discharge end by providing it with a tapered portion 27 decreasing in diameter or cross-sectional area toward the tip end of the stem and a cylindrical portion 28 between the tapered portion and the orifice 9 at the extreme tip end; the cylindrical portion 28 being of substantially the diameter of the smaller end of the tapered portion. The orifice 26 is preferably of smaller cross-sectional area than the end outlet of the discharge orifice 9, and preferably extends through a wall of the tip adjacent the larger end of the tapered portion of the passage and communicates therewith. The orifice 26 is inclined toward the discharge end 9 of the tip at an acute angle of about 45° to the main combustible gas passage. By tapering the portion 27 a part of the wall of the main gas passage is in the path of flow of the gas passing toward the orifice 9 of the tip. The size of the rod preheating flame, therefore, is dependent upon the amount of taper of the portion 27 of the main gas passage. The gradual diminishing of the cross-sectional area of the main gas passage toward the discharge orifice 9 also tends to increase the pressure of the gas, thereby insuring sufficient gas passing through the orifice 26 to provide a flame of the proper size for preheating the welding rod as it feeds toward the work.

In operation, the blowpipe apparatus described above is moved along a work surface with the supporting runners straddling the seam being welded and with the rod R resting by gravity on the sides of the seam. Fluidity of the welding puddle at the lower end of the rod may be controlled by varying the amount of heat applied thereto, by moving the flame toward or away from the puddle, by melting varying amounts of weld metal into the puddle, by agitating the puddle by moving the weld rod back and forth therein, or by any combination of these various manipulations.

To adapt the apparatus to various work conditions, the blowpipe may be replaced by one of greater or less fuel capacity, the rod guide may be exchanged for one of larger or smaller bore; and the support may be adjusted to elevate or lower the body B. The support M is preferably positioned on the opposite side of the blowipe tip from the operating handle H in order that it may not obstruct the operator's vision of the region of welding. The apparatus may be drawn along the work toward the operator while the latter rocks the apparatus about the fulcrum or axis represented by the line joining the contacting points in the runners with the work.

Various changes may be made in the structural details herein disclosed without departing from the principles of the invention, and some or all of the features of this invention may be utilized in other types of apparatus, such as those employed in electric arc welding and in oxy-acetylene cutting.

I claim:

1. In apparatus of the character described, the combination of a body member; a heating means connected thereto; a support for the body member comprising a rod bent to provide two substantially parallel members shaped to rockably contact with a work surface, said support being mounted for angular adjustment with respect to the body; and means for effecting angular adjustment of the body about the contact points of the support with the work.

2. Apparatus for use in heating work comprising, in combination, a member having an aperture therethrough; heat applying means connected therewith; and supporting means for the member including a one-piece U-shaped runner construction having a section connected between legs and extending through said aperture.

3. Apparatus for use in heating work comprising, in combination, a member having a round aperture therethrough; heat applying means connected therewith; and supporting means for the member comprising a round rod extending through said aperture, such rod being bent to form runners having curved free ends adapted for tangential contact with a work surface so as to permit free movement of the runners in any direction along the surface of the work.

4. Apparatus for use in applying heat at high temperature to work having, in combination, heating means for providing heat at high temperature; supporting means for the heating means comprising a rod connected to said heating means and angularly adjustable therewith; said rod being bent to form, in an integral construction, a connecting yoke and two spaced surface contacting members of curved contour; and a guide for directing a welding rod into the heat of the heating means.

5. Apparatus for heating work, comprising a carrying and connecting member; runners pivotally connected to said member and having free ends adapted to slidingly engage the work; means for securing said runners in any one of a number of positions relatively to said member; and heat-applying means comprising a stem secured to said member and a handle secured to said stem and operative to move said apparatus along the work and to rock the same about the line of contact of said runners and the work; said member having intersecting apertures; said runners comprising a pair of legs and an element rigidly uniting said legs and extending through one of said apertures for adjustment; and means for securing said runners in one of a number of adjusted positions comprising a device adjustable in the other of said apertures to engage and clamp said element.

6. Apparatus for heating work, comprising a carrying and connecting member; runners pivotally and directly connected to said member and having free ends adapted to slidingly engage the work; means for securing said runners in any one of a number of positions relatively to said member; and heat-applying means comprising a stem secured to said member and a handle secured to said stem and operative to move said apparatus along the work and to rock the same about the line of cntact of said runners and the work; said carrying and connecting member having an aperture therein in which the stem of said heat applying means is secured.

7. Apparatus for heating work, comprising a carrying and connecting member; runners pivotally connected to said member and having free ends adapted to slidingly engage the work; means for securing said runners in any one of a number of positions relatively to said member; and heat-applying means comprising a stem secured to said member and a handle secured to said stem and operative to move said apparatus along the work and to rock the same about the line of contact of said runners and the work; said carrying and connecting member having intersecting apertures through one of which the heat applying means extends; and adjustable means in the other aperture operative to engage and clamp said stem to said member.

8. Apparatus for heating work, comprising a carrying and connecting member; runners pivotally connected to said member and having free ends adapted to slidingly engage the work; means for securing said runners in any one of a number of positions relatively to said member; and heat-applying means comprising a stem secured to said member and a handle secured to said stem and operative to move said apparatus along the work and to rock the same about the line of contact of said runners and the work; said carrying and connecting member having an aperture adjacent each of two opposite ends thereof; said runners including a connecting element extending through one of said apertures; and the stem of said heat applying means extending through the other of said apertures.

9. Apparatus for heating work, comprising a carrying and connecting member; runners pivotally connected to said member and having free ends adapted to slidingly engage the work; means for securing said runners in any one of a number of positions relatively to said member; and heat-applying means comprising a stem secured to said member and a handle secured to said stem and operative to move said apparatus along the work and to rock the same about the line of contact of said runners and the work; said carrying and connecting member having two pairs of intersecting apertures, one pair adjacent each end thereof; said runners comprising a connecting element extending through an aperture adjacent one end and said stem extending through an aperture adjacent the other end of said member; and adjustable devices in the other aperture of said pairs, said devices respectively securing said element and said stem to said member.

10. Welding apparatus comprising in combination a carrying and connecting member having an aperture; runners pivotally connected to said member and having free ends adapted to slidingly engage the work; means for securing said runners in any one of a number of positions relatively to said member; heat-applying means comprising a stem secured to said member; a handle secured to said stem and operable to move said apparatus along the work and to rock the same about the line of contact of said runners and the work; and a welding rod guide secured in the aperture in said member.

11. Welding apparatus comprising, in combination, a carrying and connecting member having a pair of apertures; runners pivotally mounted in one of said apertures and having free end portions adapted to slidably engage the work; means for securing said runners in any one of a number of positions relatively to said member; heat-applying means comprising a stem adjustably mounted in the other aperture; a handle secured to said stem and operable to move said apparatus along the work and to rock the same about a line of contact between said runners and the work; and a welding rod guide secured to the carrying and connecting member between the stem and runners.

12. Apparatus for use in heating metal work comprising, in combination, heat applying means; a member secured to said means and having an aperture; and means for supporting at least part of the weight of said member and said heat applying means, such supporting means comprising a pair of parallel legs adapted to engage a work surface, an element rigidly connecting said legs and extending through said aperture, said element being adjustably mounted in said aperture; and means for securing said element and legs in any one of a number of adjusted positions relatively to the said member.

13. Welding apparatus comprising a nozzle having a bore terminating in an end outlet for delivering a welding jet, said bore having a side outlet for delivering a preheating jet, said bore having a tapering portion converging toward said end outlet, said side outlet having its entrance opening into said tapering portion and spaced a substantial distance from said end outlet.

14. Welding apparatus comprising a nozzle having a bore terminating in an outlet for delivering a welding jet, said bore having a side outlet for delivering a preheating jet, said side outlet being of smaller cross-sectional area than said end outlet and spaced a substantial distance from the latter, the axis of said side outlet being oblique to the axis of said bore and inclined forwardly toward said end outlet.

15. Welding apparatus comprising a nozzle having a bore terminating in an end outlet for delivering a welding jet, said bore having an elongated tapering portion converging toward said end outlet and a side outlet having its entrance opening into said tapering portion at a point sufficiently spaced from said end outlet to provide an elongated tapering portion between said end and side outlets, said side outlet being of smaller diameter than said end outlet, the axis of said side outlet being oblique to the axis of said bore and inclined forwardly toward said end outlet.

16. Welding apparatus comprising, in combination, guiding means for a welding rod; and a nozzle having a bore terminating in an end outlet for delivering a welding jet to a welding point, the axes of said guiding means and said end outlet intersecting approximately at the welding point, said bore also having a side outlet spaced a substantial distance from said end outlet for delivering a preheating jet against a rod guided to the welding point by said guiding means, said side outlet having a smaller diameter than said end outlet and the axis of said side outlet intersecting the axis of said guiding means.

JOHN M. HALBING.

CERTIFICATE OF CORRECTION.

Patent No. 2,125,916.　　　　　　　　　　　　　August 9, 1938.

JOHN M. HALBING.

It is hereby certified that error appears in the printed specification of the above numbered patent requiring correction as follows: Page 1, first column, line 18, for the word "objection" read object; page 2, first column, line 18, for "nozzles" read nozzle; line 21, before "spaced" insert is; and second column, line 7, for "in" read of; page 3, first column, line 7, claim 6, for "cntact" read contact; and that the said Letters Patent should be read with this correction therein that the same may conform to the record of the case in the Patent Office.

Signed and sealed this 25th day of October, A. D. 1938.

Henry Van Arsdale (Seal)　　　　　　　　　　　　　　　　　Acting Commissioner of Patents.